US008913679B2

(12) United States Patent
Eder et al.

(10) Patent No.: US 8,913,679 B2
(45) Date of Patent: Dec. 16, 2014

(54) SYSTEMS AND METHODS FOR JOINTLY DETECTING CHANNEL INTERFERENCE ON A SYNCHRONIZED MOBILE COMMUNICATION NETWORK

(71) Applicant: Intel Mobile Communications GmbH, Neubiberg (DE)

(72) Inventors: Franz Eder, Burgthann (DE); Axel Clausen, Munich (DE); Tobias Kurpjuhn, Groebenzell (DE); Xiaofeng Wu, Neubiberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/657,883

(22) Filed: Oct. 23, 2012

(65) Prior Publication Data

US 2014/0112404 A1    Apr. 24, 2014

(51) Int. Cl.
*H04L 7/02* (2006.01)
*H04L 1/02* (2006.01)

(52) U.S. Cl.
USPC ............................ 375/267; 375/259; 375/260

(58) Field of Classification Search
CPC .................................................. H04L 1/0618
USPC .......................................................... 375/267
See application file for complete search history.

(56) References Cited

U.S. PATENT DOCUMENTS

2010/0067599 A1* 3/2010 Dayal et al. .................. 375/267
2011/0280345 A1* 11/2011 Doan et al. ................... 375/341
2012/0198305 A1* 8/2012 Abu-Surra et al. ........... 714/758
2012/0327905 A1* 12/2012 Ma et al. ...................... 370/331
2013/0115987 A1* 5/2013 Yoo et al. ..................... 455/501
2013/0136095 A1* 5/2013 Nishio et al. ................. 370/329
2013/0223376 A1* 8/2013 Seong et al. .................. 370/329
2013/0301508 A1* 11/2013 Almog et al. ................. 370/311

OTHER PUBLICATIONS

3GPP TS 36.201; 3rd Generation Partnership Project; Technical Specification Group Radio Access Network; Evolved Universal Terrestrial Radio Access (E-UTRA); LTE physical layer; General description (Release 10); Dec. 2010; pp. 1-13.
3GPP TS 36.211; 3rd Generation Partnership Project; Technical Specification Group Radio Access Network; Evolved Universal Terrestrial Radio Access (E-UTRA); Physical Channels and Modulation (Release 10); Jun. 2012; pp. 1-101.
3GPP TS 36.212; 3rd Generation Partnership Project; Technical Specification Group Radio Access Network; Evolved Universal Terrestrial Radio Access (E-UTRA); Multiplexing and channel coding (Release 10); Jun. 2012; pp. 1-79.
3GPP TS 36.213; 3rd Generation Partnership Project; Technical Specification Group Radio Access Network; Evolved Universal Terrestrial Radio Access (E-UTRA); Physical layer procedures (Release 10); Sep. 2012; pp. 1-126.

(Continued)

*Primary Examiner* — Erin File

(57) ABSTRACT

A method for decoding a wireless channel includes generating hypotheses of how many antennas each of at least two base stations have in a synchronized network and how received signals are being transmitted for each of the at least two base stations, detecting a MIMO signal using the hypotheses and signal components received from the at least two base stations, decoding the signal, and determining whether the decoded signal is valid by performing a cyclical redundancy check calculation.

21 Claims, 3 Drawing Sheets

(56) References Cited

OTHER PUBLICATIONS

3GPP TS 36.214; 3rd Generation Partnership Project; Technical Specification Group Radio Access Network; Evolved Universal Terrestrial Radio Access (E-UTRA); Physical layer; Measurements (Release 10); Mar. 2011; pp. 1-13.

3GPP TS 36.216; 3rd Generation Partnership Project; Technical Specification Group Radio Access Network; Evolved Universal Terrestrial Radio Access (E-UTRA); Physical layer for relaying operation (Release 10); Sep. 2011; pp. 1-16.

3GPP TS 36.331; 3rd Generation Partnership Project; Technical Specification Group Radio Access Network; Evolved Universal Terrestrial Radio Access (E-UTRA); Radio Resource Control (RRC); Protocol specification (Release 10); Sep. 2012; pp. 1-304.

* cited by examiner

SYSTEMS AND METHODS FOR JOINTLY DETECTING CHANNEL INTERFERENCE ON A SYNCHRONIZED MOBILE COMMUNICATION NETWORK

FIELD OF THE DISCLOSURE

This disclosure relates to systems and methods for mobile communication and, more particularly, to systems and methods for jointly detecting channel interference and signals on a synchronized mobile communication network.

BACKGROUND

Mobile communication systems generally have the need to transmit system information to mobile units. For example, in a Long Term Evolution (LTE) cellular mobile communication system, the Physical Broadcast Channel (PBCH) is used to transmit Master Information Blocks (MIBs) which are needed to be received and decoded by mobile User Equipment (UE) to gain initial access to the network.

Recent developments in mobile communication have advanced the introduction of heterogeneous networks. In a heterogeneous network, macro cells generally cover large areas, while pico or femto cells are generally placed within, for example, macro cell coverage areas in order increase capacity and/or coverage in areas prone to signal loss.

As an example, a basement of a concrete building may be a poor location for receiving signals from a macro cell. If the signal loss is significant enough, this basement location may be a so called "deadspot" within the macro cell coverage area. Use of, for example a pico or femto cell, may be used in a heterogeneous network to provide an additional small coverage area to such deadspots.

Heterogeneous networks may be synchronized such that the radio frame structure of the cells is aligned. That is, the radio frame structure of macro, pico, and/or femto cells are generally aligned in such a network. As a result, some system information may be difficult to receive as a result of inter-cell interference. In the case of LTE, for instance, the PBCH of one cell is generally transmitted at the same time as the PBCH of all other cells.

What is needed are methods and devices for jointly detecting channel interference and signals on a synchronized mobile communication network that solves one or more of the problems described herein and/or one or more problems that may come to the attention of one skilled in the art upon becoming familiar with this specification.

SUMMARY

In an aspect of this disclosure, a method for decoding a wireless channel includes generating hypotheses of how many antennas each of at least two base stations have in a synchronized network and how received signals are being transmitted for each of the at least two base stations, detecting a multiple-input and multiple-output (MIMO) signal using the hypotheses and signal components received from the at least two base stations, decoding the signal, and determining whether the decoded signal is valid by performing a cyclical redundancy check calculation.

In an another aspect of this disclosure, a mobile wireless device includes a hypothesis generator, a MIMO detector provided with the number of possible antennas for each of at least two base stations, a decoder, and a cyclic redundancy check (CRC) checker. The hypothesis generator is configured to generate hypotheses of how many antennas each of at least two base stations have in a synchronized network when the at least two base stations are concurrently within wireless proximity of the mobile wireless device, and how received signals are being transmitted for each of the at least two base stations. The MIMO detector is configured to estimate a signal based on wireless components received from the at least two base stations. The decoder is configured to decode the signal into a decoded signal. The CRC checker is configured to determine whether the decoded signal is valid by performing a cyclical redundancy check calculation In yet another aspect of this disclosure, the method summarized heretofore is encoded on non-transitory computer readable medium, and decodes a wireless channel when executed by a computer.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

Figure 1:
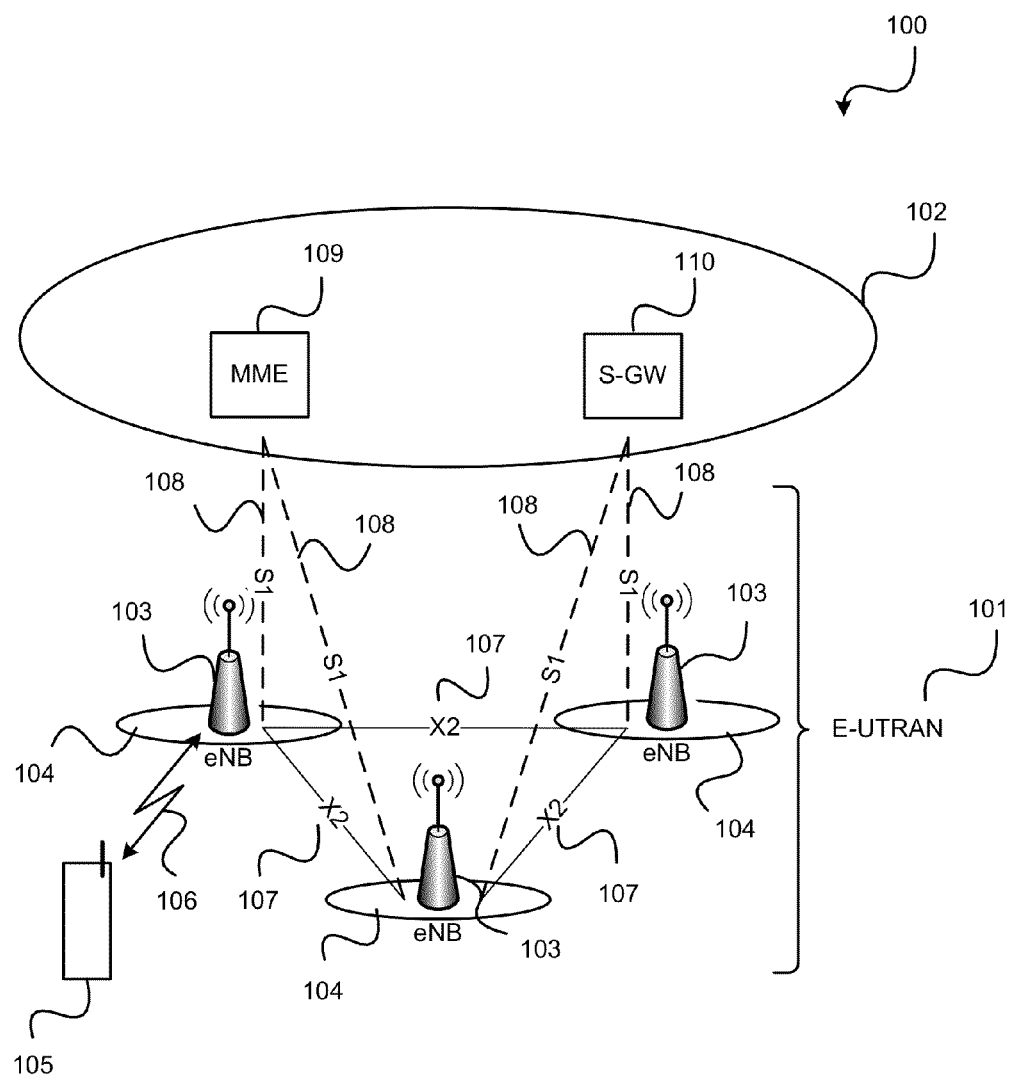
FIG. 1 is a mobile communication network.

FIG. 1 is a mobile communication network. The communication system 100 is a cellular mobile communication system (also referred to herein as cellular radio communication network or mobile communication network) including a radio access network (e.g. an E-UTRAN, Evolved UMTS Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment or mobile wireless device) 105 located in a mobile radio cell 104 may communicate with the core network 102 and with other mobile terminals 105 via the base station providing coverage in (in other words operating) the mobile radio cell. In other words, the base station 103 operating the mobile radio cell 104 in which the mobile terminal 105 is located provides the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data are transmitted between a base station 103 and a mobile terminal 105 located in the mobile radio cell 104 operated by the base station 103 over the air interface 106 on the basis of a multiple access method.

Air interface 106 comprises several physical channels which can be grouped into uplink and downlink channels. Channels in the downlink, for instance, include:

- the Physical Control Channel (PDCCH) which conveys uplink and downlink radio resource allocation information;
- the Physical Control Format Indicator Channel (PCFICH) which is used to signal the length of the PDCCH;
- the Physical Hybrid ARQ Indicator Channel (PHICH) which is used to carry acknowledgements of uplink transmissions;
- the Physical Downlink Shared Channel (PDSCH) which is used for Layer-1 physical downlink transport data transmission;
- the Physical Multicast Channel (PMCH) which is used for broadcast transmission using a Single Frequency Network; and
- the Physical Broadcast Channel (PBCH) which is used to broadcast basic system information within a cell including master information blocks (MIBs).

Channels in the uplink, for instance, include:

- the Physical Random Access Channel (PRACH) which is used for initial access and uplink synchronization;
- the Physical Uplink Shared Channel (PUSCH) which carries the Layer-1 physical uplink transport data along with various control information; and
- the Physical Uplink Control Channel (PUCCH) which also carries control information.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110 and the base stations 103, i.e. a base station 103 can be connected to more than one MME/S-GW 109, 110 and an MME/S-GW can 109, 110 be connected to more than one base station 103. This enables network sharing in LTE.

For example, the MME 109 may be responsible for controlling the mobility of mobile terminals located in the coverage area of E-UTRAN, while the S-GW 110 is responsible for handling the transmission of user data between mobile terminals 105 and core network 102.

In the case of LTE, the radio access network 101, i.e. the E-UTRAN 101 in case of LTE, can be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:

Functions for Radio Resource Management: Radio Bearer Control, Radio Admission Control, Connection Mobility Control, dynamic allocation of resources to UEs 105 in both uplink and downlink (scheduling);

IP header compression and encryption of user data stream;

Selection of an MME 109 at UE 105 attachment when no routing to an MME 109 can be determined from the information provided by the UE 105;

Routing of User Plane data towards Serving Gateway (S-GW) 110;

Scheduling and transmission of paging messages (originated from the MME);

Scheduling and transmission of broadcast information (originated from the MME 109 or O&M (Operation and Maintenance));

Measurement and measurement reporting configuration for mobility and scheduling;

Scheduling and transmission of PWS (Public Warning System, which includes ETWS (Earthquake and Tsunami Warning System) and CMAS (Commercial Mobile Alert System)) messages (originated from the MME 109);

CSG (Closed Subscriber Group) handling.

Each base station of the communication system 100 controls communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with the mobile radio cell 104) it communicates with the base station 103 controlling that mobile radio cell 104.

The communication system 100 is heterogeneous and synchronized. The mobile radio cells 104 have various coverage and capacity capabilities, and their geographic coverage areas may overlap; a macro cell, for example, may cover of large area in which one or more pico or femto cells are also present (not shown). The communication system 100 is synchronized such that the radio frame structures of radio cells 104 are aligned.

Figure 2:
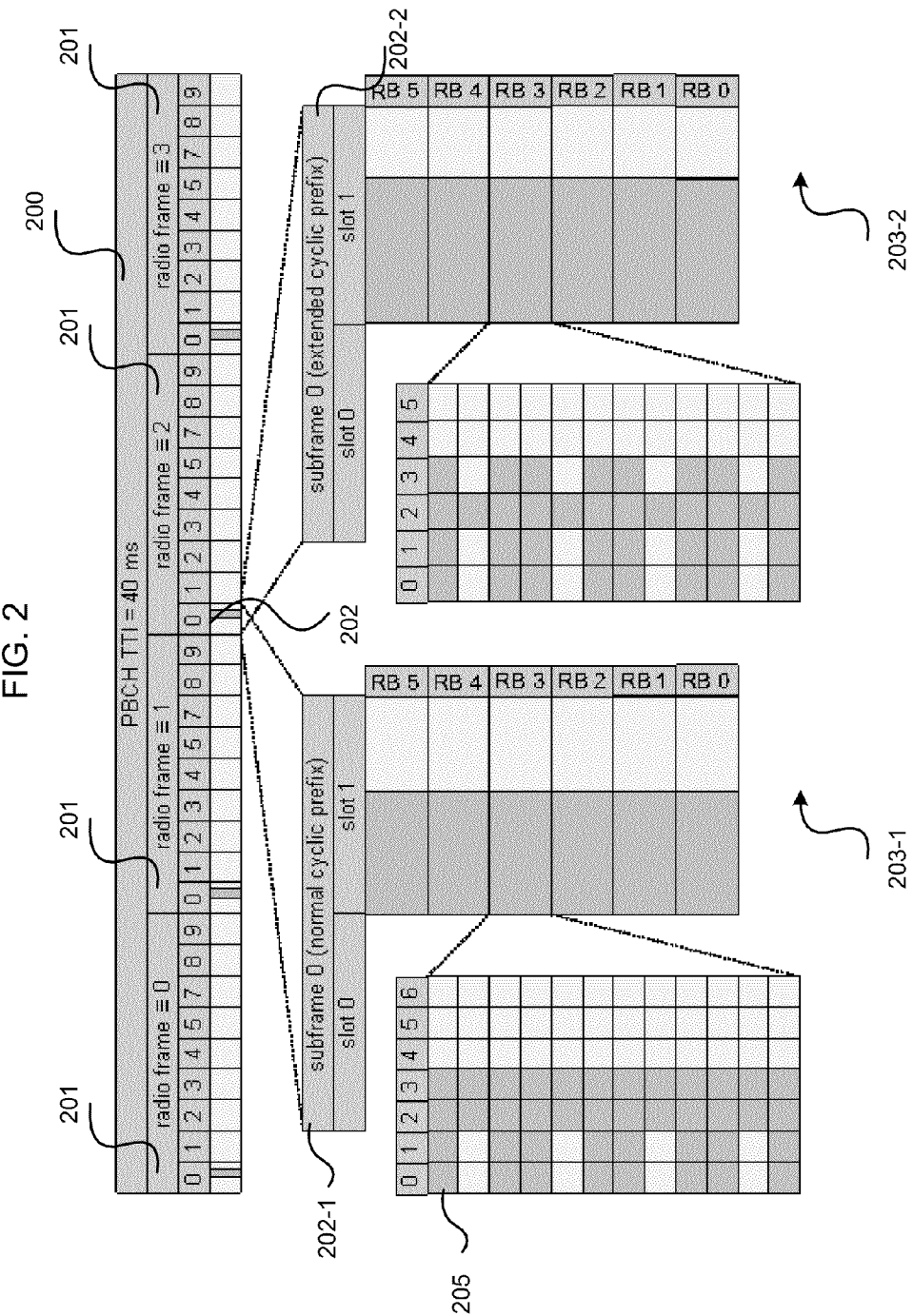
FIG. 2 illustrates RE allocation of a PBCH.

FIG. 2 illustrates Resource Element (RE) allocation of a Physical Broadcast Channel (PBCH). The Transmission Time Interval (TTI) 200 is 40 ms, which is shown as being divided into four radio frames 201 numbered sequentially from 0 to 3. Each radio frame 201 is further divided into ten subframes numbered sequentially from 0 to 9. The PBCH is scheduled in the $0^{th}$ subframe 202 of each radio frame 201. Depicted separately, subframe 202 may be implemented with a normal 202-1 or extended cyclic prefix 202-2. Subframe 202 further comprises two slots, numbered sequentially 0 and 1, which comprise Radio Bearers (RBs) numbered from 0 to 5. The PBCH is located in slot 1 of each $0^{th}$ subframe 202 of each radio frame 201. In the case of a normal cyclic prefix 202-1, there are 960 separate REs 205, while in the case of an extended cyclic prefix 202-2, there are 864 separate REs 205. The PBCH being Quadratic Phase Shift Key (QPSK) modulated, results in 1920 bits per TTI in the case of a normal cyclic prefix, and 1728 bits per TTI in the case of a extended cyclic prefix.

In an LTE system, such as communication system 100, the MIB is transmitted on the PBCH and consists of 14 bits of information. The PBCH is a broadcast channel and is generally transmitted with a relatively high power and therefore is a strong source of interference for UEs 105 at mobile radio cell 104 coverage boundaries which receive signals from multiple mobile radio cells. This type of interference is generally common in heterogeneous networks with pico and femto cells operating within a larger macro cell coverage area.

Since a pico cell or femto cell transmits with less power than a macro cell, the coverage area of one pico cell or femto cell is relatively small. The coverage area of pico or femto cells, however, is often increased by operating with a negative handover bias. That is, for example, when a UE 105 in the proximity of a pico cell and macro cell, the UE may connect, or stay connected with, the pico cell, up until a certain biased signal strength threshold is surpassed. Handover of the UE 105 from the pico cell to the macro cell is only performed if the signal from the macro cell minus the handover bias is stronger than the pico cell signal. In some cases the handover bias may be as large as 7 dB. In terms of interference, however, such a case requires the UE to be able to detect signals which are up to 7 dB weaker than the interference caused by overlapping mobile radio cell 104 coverage boundaries.

In detecting and decoding the MIB transmitted on the PBCH with interference caused by overlapping mobile radio cell 104 coverage boundaries, an aspect of the disclosure supports joint reception of I≥1 PBCHs from I cells which are time and frequency synchronized cells indexed by i∈{0, . . . , I−1}. It is assumed for the sake of demonstration that the PBCHs are perfectly overlapped, and that the UE 105 has Q∈{1, 2, 4, 8} receiver antennas.

The UE 105 performs a cell search as an initial step to gain access to a network. After the search has found a valid cell and potentially other interfering cells, the UE 105 starts the reception and decoding of the PBCH. The following information, therefore, is generally available to the UE 105 after the cell search has been performed.

The number of cells I∈{1, . . . }.
The radio frame timing.
The cell ID $N_{ID}^{cell}[i]$ of the I cells under consideration.
The set of frequency-direction indices K of resource elements that contain at least the centre six resource blocks.
The set of time-direction indices L of resource elements that contain at least the four OFDM-symbols 0, . . . , 3 in time slot 1 of subframe 0 under consideration.
The received complex resource elements $y_q[k,l] \in C$ for RX-antenna q∈{0, . . . , Q−1}.
The estimated channel coefficients $\hat{h}_{q,p}^{(i)}[k,l]$ for q∈Q and p∈{0, 1, 2, 3} and cell i.
The estimated RX noise covariance matrix $\hat{\phi}_z \in C^{Q \times Q}$.
The data-to-pilot dependent scaling ratios (DPR) $Q_i$.

It should be noted that when there are less than four TX-antenna ports, the channel coefficients with a larger antenna port number may be corrupted. This is acceptable as the hypothesis testing step can deal with it.

According to an aspect of this disclosure, the following information is detected for each i cell index where i∈{0, . . . , I−1}:

The number of cell-specific antenna port P[i]∈{1, 2, 4}.
The TTI timing.
The PBCH payload, and in particular, the MIB.
Resource Element Allocation.

The Common Reference Signal (CRS) may be shifted in the frequency domain based on the cell ID. Depending on the cell ID of the target cell and the interfering cell, three different scenarios can occur assuming only two cells i∈{0,1}: (1) cell 0 and 1 both transmit the PBCH on same RE; (2) cell i transmits PBCH, and cell 1−i transmits CRS; and (3) cell i transmits PBCH, and cell 1−i transmits DTX (Discontinuous Transmission). It should be noted that DTX in the last scenario generally only occur in symbol 1 if the eNodeB does not utilize all antenna ports. It should be further noted that the second scenario, where cell i transmits PBCH, and cell 1−i transmits the CRS, may be simplified into the last scenario by applying CRS cancellation. Thus, by applying CRS cancellation to the second scenario, only the first scenario and last scenario require solutions. That is, solutions to the following two scenarios are desired: cell 0 and 1 both transmit the PBCH on same RE; and cell i transmits PBCH, and cell 1−i transmits DTX.

Figure 3:
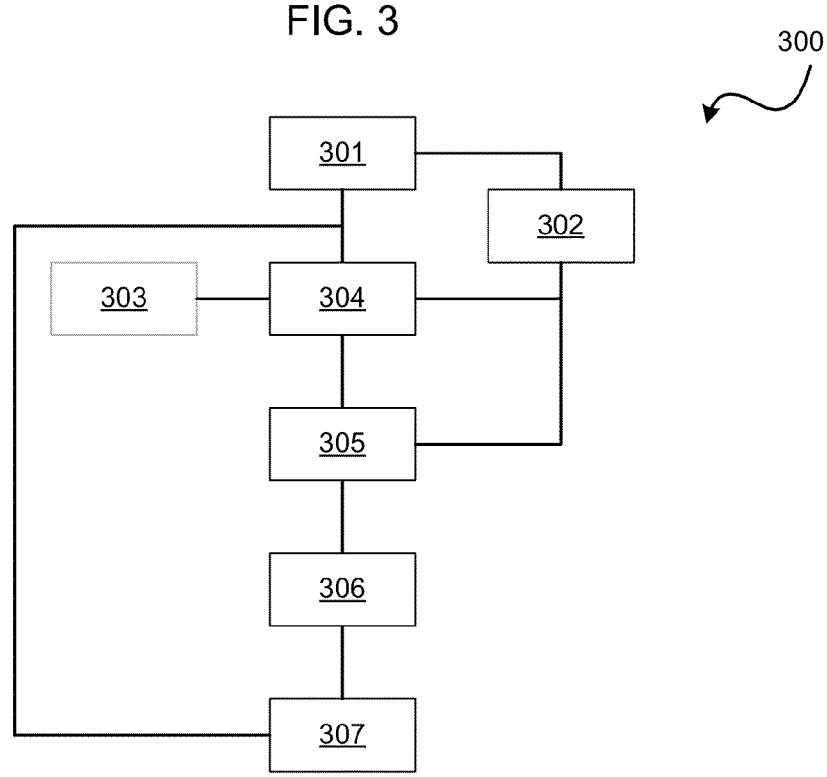
FIG. 3 is a block diagram of a PBCH decoder, according to an aspect of this disclosure.

FIG. 3 is a block diagram of a PBCH decoder according to an aspect of this disclosure. Since the UE does not have information related to the eNodeB number of used transmit antennas, the PBCH decoder 300 generates several hypotheses. These hypotheses may be generated in either a serial process or a parallel process. A hypothesis is generated for each possible number of eNodeB antenna ports. That is, after a fast fourier transformer 301 has performed Fast Fourier Transform (FFT) on received signals, a set of possible antenna ports 303 is provided as input to a hypothesis generator 304. Channel estimator 302 also provides channel estimations to the hypothesis generator 304. Hypothesis generator 304, based on the described input, generates hypotheses which are provided to a MIMO detector 305 and a convolutional decoder 306. A CRC checker 307 then provides CRC checking, which determines, upon a successful CRC check, that the PBCH has been successfully decoded. If the CRC check is unsuccessful, CRC checker 307 signals to hypothesis generator 304 that the previously generated hypothesis has been proven false. Additional hypotheses may be generated by hypothesis generator 304 until the PBCH is successfully decoded.

The following mathematical framework is used in the scenario where cell 0 and 1 both transmit the PBCH on the same RE. Where n∈{0,1} is a logical RE index, and without loss of generality, $P_i=\{0,1\}$ for i∈{0, . . . I−1}, and q∈{0, . . . , Q−1} is the RX-antenna index, the received complex resource element can be expressed as:

$$y_q[n] = \sum_{i=0}^{I-1} \sum_{p=0}^{1} h_{q,p}^{(i)}[n]\varrho_i x_p^{(i)}[n] + z_q[n].$$

Let $$s^{(i)} := \begin{pmatrix} s^{(i)}[0] \\ s^{(i)}[1] \end{pmatrix}$$

be the transmitted Alamouti pair on cell i∈{0, . . . , I−1}, where $$s^{(i)}[m] \in \left\{ \pm \frac{1}{\sqrt{2}} \pm \sqrt{-1}\, \frac{1}{\sqrt{2}} \right\}$$

is the QPSK modulation symbol corresponding to relative data symbol index m∈{0,1}.

Thus it is given that $|s^{(i)}[m]|^2=1$. The transmitted symbol can be written as:

$$\begin{pmatrix} x_0^{(i)}[0] & x_0^{(i)}[1] \\ x_1^{(i)}[0] & x_1^{(i)}[1] \end{pmatrix} := \begin{pmatrix} s^{(i)}[0] & s^{(i)}[1] \\ -s^{(i)}[1]^* & s^{(i)}[0]^* \end{pmatrix}.$$

We get $$y_q[0] = \sum_{i=0}^{I-1} (\varrho_i h_{q,0}^{(i)}[0]s^{(i)}[0] - \varrho_i h_{q,1}^{(i)}[0]s^{(i)}[1]^*) + z_q[0],$$

$$y_q[1] = \sum_{i=0}^{I-1} (\varrho_i h_{q,0}^{(i)}[1]s^{(i)}[1] + \varrho_i h_{q,1}^{(i)}[1]s^{(i)}[0]^*) + z_q[1],$$

In matrix form, this can be re-written as:

$$\begin{pmatrix} y_q[0] \\ y_q[1]^* \end{pmatrix} = \begin{pmatrix} \varrho_0 h_{q,0}^{(0)}[0] & -\varrho_0 h_{q,1}^{(0)}[0] & \cdots & \varrho_{l-1} h_{q,0}^{(l-1)}[0] & -\varrho_{l-1} h_{q,1}^{(l-1)}[0] \\ \varrho_0 h_{q,1}^{(0)}[1]^* & \varrho_0 h_{q,0}^{(0)}[1]^* & \cdots & \varrho_{l-1} h_{q,1}^{(l-1)}[1]^* & \varrho_{l-1} h_{q,0}^{(l-1)}[1]^* \end{pmatrix}$$

$$\begin{pmatrix} s^{(0)}[0] \\ s^{(0)}[1]^* \\ \vdots \\ s^{(l-1)}[0] \\ s^{(l-1)}[1]^* \end{pmatrix} + \begin{pmatrix} z_q[0] \\ z_q[1]^* \end{pmatrix}.$$

Defining $$y_q := \begin{pmatrix} y_q[0] \\ y_q[1]^* \end{pmatrix} \in \mathbb{C}^{2 \times 1},$$

$$H_q := \begin{pmatrix} \varrho_0 h_{q,0}^{(0)}[0] & -\varrho_0 h_{q,1}^{(0)}[0] & \cdots & \varrho_{l-1} h_{q,0}^{(l-1)}[0] & -\varrho_{l-1} h_{q,1}^{(l-1)}[0] \\ \varrho_0 h_{q,1}^{(0)}[1]^* & \varrho_0 h_{q,0}^{(0)}[1]^* & \cdots & \varrho_{l-1} h_{q,1}^{(l-1)}[1]^* & \varrho_{l-1} h_{q,0}^{(l-1)}[1]^* \end{pmatrix} \in \mathbb{C}^{2 \times 2l},$$

$$s := \begin{pmatrix} s^{(0)}[0] \\ s^{(0)}[1]^* \\ \vdots \\ s^{(l-1)}[0] \\ s^{(l-1)}[1]^* \end{pmatrix} \in \mathbb{C}^{2l \times 1},$$

and $$z_q := \begin{pmatrix} z_q[0] \\ z_q[1]^* \end{pmatrix} \in \mathbb{C}^{2 \times 1}.$$

Then $y_q = H_q s + z_q$. Finally, defining $$y := \begin{pmatrix} y_0 \\ \vdots \\ y_{Q-1} \end{pmatrix} \in \mathbb{C}^{2Q \times 1},$$

$$H := \begin{pmatrix} H_0 \\ \vdots \\ H_{Q-1} \end{pmatrix} \in \mathbb{C}^{2Q \times 2l},$$

$$z := \begin{pmatrix} z_0 \\ \vdots \\ z_{Q-1} \end{pmatrix} \in \mathbb{C}^{2Q \times 1}.$$

Then $y = Hs + z$. With this notation it is possible to consider also Alamouti transmit-diversity in a MIMO context. Alamouti transmit-diversity is described in U.S. Pat. No. 6,185,258, the contents of which are incorporated by reference in its entirety herein. With Q=1 RX antennas optimally detection of one PBCH, utilizing a 2×2 MIMO detector, is possible even with a frequency selective channel. With Q=2 RX antennas optimal joint detection of two PBCHs, utilizing a 4×4 MIMO detector, is possible even with a frequency selective channel. Generalizing, with Q RX antennas it is possible to optimally decode Q PBCH with a MIMO detector even in frequency selective fading. The MIMO detectors 305 may also be operated in an iterative fashion by feeding back information available from the channel decoder. It may be assumed that z is strictly circular symmetric normally distributed, and that z may have an arbitrary positive-definite Hermitian covariance matrix since noise whitening may be performed subsequently.

Figure 4:
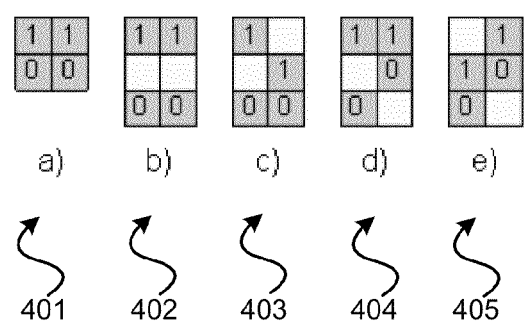
FIG. 4 illustrates PBCH decoding in accordance with FIG. 3 in a two cell scenario, according to an aspect of this disclosure.

FIG. 4 illustrates PBCH decoding in accordance with FIG. 3 in a two cell scenario, according to an aspect of this disclosure. To concisely demonstrate a two cell scenario, it is assumed that each cell has at least two antenna ports. Taking Alamouti pairing into account, there remains several sub-cases. FIG. 4, in particular, illustrates cases 401, 402, 403, 404, and 405, in which the left column is cell 0, the right column is cell 1, and the column represents frequency direction. Blanked fields indicate DTX RE, a field labeled with 0 or 1 indicate a RE with the Alamouti pair RE 0 or 1.

Blanked REs are DTX, and may be handled, if necessary, as described above with CRS cancellation. Cases 401 and 402, therefore, are the most difficult sub-cases and are thus discussed in detail herein. While cases 401 and 402 are discussed in detail, it is understood that the following formulas may be applied to all of the possible scenarios. The eNodeB may use 1, 2, or 4 antenna ports. Since the UE does not know how many antenna ports are used, it assumes different hypotheses, as described below.

In the hypothesis where cell 0 and 1 both transmit the PBCH within the current RE, then $y_q = h_q^{(0)} e_0 x^{(0)} + h_q^{(1)} e_1 x^{(1)} + z_q$. It should be noted that this describes a Q×2 MIMO system. If, however, cell transmits PBCH, and cell 1−i transmits CRS, then $y_q = h_q^{(i)} e_i x^{(i)} + h_q^{(1-i)} + z_q$. If, on the other hand, cell transmits PBCH, and cell 1−i transmits DTX, we have $y_q = h_q^{(i)} e_i x^{(i)} + z_q$.

In the hypothesis where cell 0 has one cell-specific antenna port and cell 1 has two cell-specific antenna ports, if cell 0 and 1 both transmit the PBCH within the current RE, then $$y_q = h_q^{(0)} \varrho_0 x^{(0)} + \sum_{p \in \{0,1\}} h_{q,p}^{(1)} \varrho_1 x_p^{(1)} + z_q.$$

If, however, cell 0 transmits PBCH, and cell 1 transmits CRS on port $p \in \{0,1\}$, then $y_q = h_q^{(0)} e_0 x^{(0)} + h_{q,p}^{(1)} + z_q$. If, on the other hand, cell 0 transmits CRS, and cell 1 transmits PBCH, then $$y_q = h_q^{(0)} + \sum_{p \in \{0,1\}} h_{q,p}^{(1)} \varrho_1 x_p^{(1)} + z_q.$$

If cell 0 transmits PBCH, and cell 1 transmits DTX, then, and if cell 0 transmits DTX, and cell 1 transmits PBCH, then $$y_q = \sum_{p \in \{0,1\}} h_{q,p}^{(1)} \varrho_1 x_p^{(1)} + z_q.$$

In the hypothesis where cell 0 has one cell-specific antenna port, and cell 1 has four cell-specific antenna ports, if cell 0 and 1 both transmit the PBCH within the current RE, then with $P \in \{\{0,2\},\{1,3\}\}$, $$y_q = h_q^{(0)} \varrho_0 x^{(0)} + \sum_{p \in P} h_{q,p}^{(1)} \varrho_1 x_p^{(1)} + z_q.$$

If, however, cell 0 transmits PBCH, and cell 1 transmits CRS on port $p \in \{0, \ldots, 3\}$, then $y_q = h_q^{(0)} e_0 x^{(0)} + h_{q,p}^{(1)} + z_q$. If, on the other hand, cell 0 transmits CRS, and cell 1 transmits PBCH, then with $P \in \{\{0,2\},\{1,3\}\}$, $$y_q = h_q^{(0)} + \sum_{p \in P} h_{q,p}^{(1)} \varrho_1 x_p^{(1)} + z_q.$$

If cell 0 transmits DTX, and cell 1 transmits PBCH, then with $P \in \{\{0,2\},\{1,3\}\}$, $$y_q = \sum_{p \in P} h_{q,p}^{(1)} \varrho_1 x_p^{(1)} + z_q.$$

In the hypothesis where both cell 0 and cell 1 have two cell-specific antenna ports and both transmit the PBCH within the current RE, then $$y_q = \sum_{p \in \{0,1\}} h_{q,p}^{(0)} \varrho_0 x_p^{(0)} + \sum_{p \in \{0,1\}} h_{q,p}^{(1)} \varrho_1 x_p^{(1)} + z_q.$$

If, however, cell i transmits PBCH, and cell 1−i transmits CRS on port $p_{1-i} \in \{0,1\}$, then $$y_q = \sum_{p \in \{0,1\}} h_{q,p}^{(i)} \varrho_i x_p^{(i)} + h_{q,p_{1-i}}^{(1-i)} + z_q.$$

If, on the other hand, cell transmits PBCH, and cell 1−i transmits DTX, then $$y_q = \sum_{p \in \{0,1\}} h_{q,p}^{(i)} \varrho_i x_p^{(i)} + z_q.$$

In the hypothesis where cell 0 has two cell-specific antenna port, and cell 1 has four cell-specific antenna ports, if cell 0 and 1 both transmit the PBCH within the current RE, then with $P_1 \in \{\{0,2\},\{1,3\}\}$, $$y_q = \sum_{p \in \{0,1\}} h_{q,p}^{(0)} \varrho_0 x_p^{(0)} + \sum_{p \in P_i} h_{q,p}^{(1)} \varrho_1 x_p^{(1)} + z_q.$$

If however, cell 0 transmits PBCH, and cell 1 transmits CRS on port $p_1 \in \{0, \ldots, 3\}$, then $$y_q = \sum_{p \in \{0,1\}} h_{q,p}^{(0)} \varrho_0 x_p^{(0)} + h_{q,p_1}^{(1)} + z_q.$$

If, on the other hand, cell 0 transmits CRS on port $p_0 \in \{0, \ldots, 3\}$, and cell 1 transmits PBCH, then with $P \in \{\{0,2\},\{1,3\}\}$, $$y_q = h_{q,p_0}^{(0)} + \sum_{p \in P} h_{q,p}^{(1)} \varrho_1 x_p^{(1)} + z_q.$$

If cell 0 transmits DTX, and cell 1 transmits PBCH, then with $P \in \{\{0,2\},\{1,3\}\}$, $$y_q = \sum_{p \in P} h_{q,p}^{(1)} \varrho_1 x_p^{(1)} + z_q.$$

In the hypothesis where cell 0 and cell 1 have four cell-specific antenna ports and both transmit the PBCH within the current RE, then with $P_0, P_1 \in \{\{0,2\},\{1,3\}\}$, $$y_q = \sum_{p \in P_0} h_{q,p}^{(0)} \varrho_0 x_p^{(0)} + \sum_{p \in P_1} h_{q,p}^{(1)} \varrho_1 x_p^{(1)} + z_q.$$

If, however, cell i transmits PBCH on ports $P_i \in \{\{0,2\},\{1,3\}\}$, and cell 1−i transmits CRS on port $p_{1-i} \in \{0,1\}$, then $$y_q = \sum_{p \in P_i} h_{q,p}^{(i)} \varrho_i x_p^{(i)} + h_{q,p_{1-i}}^{(1-i)} + z_q.$$

It is envisioned that the above described joint detection methods and systems herein may be combined with successive interference cancellation to cover scenarios with more interfering cells than number of cells which can be jointly detected. A combined joint detection (JD)/successive cancelling (SC) method for PBCH reception that supports I cells, performs the following: (1) determines the strongest cell $c_0$ among the cells of interest, if there are any cells of interest; (2) determines the $I_0 \in \{0, \ldots, I-1\}$ strongest cells $c_1, \ldots, c_{I_0}$ radio-frame synchronized with cell $c_0$; (3) jointly detects PBCH (covering all hypothesis) on cells $c_0, \ldots, c_{I_0}$ in the subframe under consideration; (4) performs cancellation on cells any cells that do not pass a CRC, and revert to (1) in the method; and (5) continue at (3) in the method with next PBCH subframe.

It should be noted that the case I=1 is the special case of pure successive cancellation, whereas, in practice, I=2 is more realistic. It is envisioned that the methods and systems presented herein may also be applied to other colliding physical channels that use a single antenna port or transmit diversity transmission schemes, for example the LTE PDCCH interference suppression.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A method for decoding a wireless channel comprising:
    generating hypotheses for a first number of antennas at each of at least two base stations in a synchronized network;
    detecting a MIMO (multiple-input and multiple-output) signal using the hypotheses and signal components received from the at least two base stations;
    decoding the signal;
    determining whether the decoded signal is valid by performing a CRC (cyclical redundancy check) calculation; and
    generating an additional hypothesis for a second number of antennas at each of the at least two base stations and for how received signals are being transmitted for each of the at least two base stations if the cyclical redundancy check calculation indicates that the decoded signal is not valid, wherein the second number of antennas is different than the first number of antennas.

2. The method of claim 1 wherein decoding comprises performing convolutional decoding.

3. The method of claim 1 wherein the synchronized network is a LTE cellular mobile communication system.

4. The method of claim 3 wherein the wireless channel is a PBCH (Physical Broadcast Channel) used to transmit a MIB (Master Information Blocks).

5. The method of claim 3 wherein the wireless channel is a PDCCH (Physical Control Channel).

6. The method of claim 1, further comprising:
performing a fast fourier transform on the received signals; and
performing channel estimations of the received signals.

7. The method of claim 1, further comprising:
determining a first base station, of the at least two base stations, the first base station providing a first signal at a given reception location;
determining a second base station, of the at least two base stations, the second base station being synchronized with the first cell and the second base station providing a second signal; and
cancelling interference contained in the second signal caused by first signal, the first signal being the validly decoded signal.

8. A mobile wireless device comprising:
a hypothesis generator, configured to generate hypotheses for a first number of antennas at each of at least two base stations in a synchronized network when the at least two base stations are concurrently within wireless proximity of the mobile wireless device;
a MIMO (multiple-input and multiple-output) detector provided with the number of possible antennas for each of at least two base stations, and configured to estimate a signal based on wireless components received from the at least two base stations;
a decoder configured to decode the signal into a decoded signal;
a CRC (cyclical redundancy check) checker configured to determine whether the decoded signal is valid by performing a cyclical redundancy check calculation; and
the hypothesis generator further configured to generate an additional hypothesis for a second number of antennas at each of the at least two base stations if the cyclical redundancy check calculation indicates that the decoded signal is not valid, wherein the second number of antennas is different than the first number of antennas.

9. The mobile wireless device of claim 8 wherein the decoder is a convolutional decoder.

10. The mobile wireless device of claim 8 wherein the synchronized network is a LTE cellular mobile communication system.

11. The mobile wireless device of claim 10 wherein the signal comprises a PBCH (Physical Broadcast Channel) and is used to transmit a MIB (Master Information Blocks).

12. The mobile wireless device of claim 10 wherein the signal comprises a PDCCH (Physical Control Channel).

13. The mobile wireless device of claim 8, further comprising:
a fast fourier transformer configured to provided fast fourier transformation on the received signals; and
a channel estimator configured to provided channel estimates of the received signals.

14. The mobile wireless device of claim 8, further comprising a cancellation module for performing the method comprising:
determining a first base station, of the at least two base stations, the first base station providing a first signal at a given reception location; and
determining a second base station, of the at least two base stations, the second base station being synchronized with the first cell and the second base station providing a second signal; and;
cancelling interference contained in the second signal caused by first signal, the first signal being the validly decoded signal.

15. A non-transitory computer readable medium encoded with a method which, when executed by a computer, decodes a wireless channel, the method comprising:
generating hypotheses for a first number of antennas at each of at least two base stations in a synchronized network;
detecting a MIMO (multiple-input and multiple-output) signal using the hypotheses and signal components received from the at least two base stations;
decoding the signal; and
determining whether the decoded signal is valid by performing a cyclical redundancy check calculation; and
generating an additional hypothesis for a second number of antennas at each of the at least two base stations if the cyclical redundancy check calculation indicates that the decoded signal is not valid, wherein the second number of antennas is different than the first number of antennas.

16. The non-transitory computer readable medium of claim 15 wherein decoding comprises performing convolutional decoding.

17. The non-transitory computer readable medium of claim 15 wherein the synchronized network is a LTE cellular mobile communication system.

18. The non-transitory computer readable medium of claim 17 wherein the wireless channel is a PBCH (Physical Broadcast Channel) used to transmit a MIB (Master Information Blocks).

19. The non-transitory computer readable medium of claim 17 wherein the wireless channel is a PDCCH (Physical Control Channel).

20. The non-transitory computer readable medium of claim 15, further comprising:
performing a fast fourier transform on the received signals; and
performing channel estimations of the received signals.

21. The non-transitory computer readable medium of claim 15, further comprising:
determining a first base station, of the at least two base stations, the first base station providing a first signal at a given reception location;
determining a second base station, of the at least two base stations, the second base station being synchronized with the first cell and the second base station providing a second signal; and
cancelling interference contained in the second signal caused by first signal, the first signal being the validly decoded signal.

* * * * *